July 10, 1962     A. L. HUBBARD     3,043,075

COTTON HARVESTER

Filed May 31, 1960

*INVENTOR.*
A. L. HUBBARD

BY *William A. Murray*

ATTORNEY

United States Patent Office 3,043,075
Patented July 10, 1962

3,043,075
COTTON HARVESTER
Arthur L. Hubbard, Des Moines, Iowa, assignor to Deere & Company, Moline, Ill., a corporation of Delaware
Filed May 31, 1960, Ser. No. 32,693
2 Claims. (Cl. 56—40)

This invention relates to an improvement in a cotton harvester and more particularly to an improvement which maintains the area adjacent the harvesting mechanism relatively clear of an accumulation of dirt or other material.

The present improvement may be best used in a cotton harvester shown and described in U.S. Patent 2,904,948, issued to Mr. A. L. Hubbard, September 22, 1959. The harvester thereshown is of the type having a cotton picking drum mounted on an upright axis with a plurality of vertically spaced and laterally extending cotton picker spindles. The picking drum is arranged on a mobile frame so that as the machine advances, the spindles will move into the plants of cotton and pick the cotton therefrom. The drum is rotated so as to move the picker spindles from the position within the cotton plant inwardly to a housing containing the doffing mechanism which serves to dislodge the cotton bolls from the spindles. The doffing mechanism comprises an upright shaft on which is a plurality of disks or doffing plates spaced apart vertically on the order of the spacing of the spindles. The doffing means or drum is positioned so that the doffing plates engage the cotton on the associated spindles and removes the cotton by wiping or brushing the cotton bolls from the spindles. These principles of harvesting, as outlined, are well-known throughout the industry and have conventionally been used for several years. In the harvesting mechanism the picking drum and doffing drum normally extend upright from a laterally disposed floor structure which may be composed of solid panels or laterally disposed structural members. In either case, there will be laterally disposed surfaces on which dirt, trash, and even cotton bolls may gravitate. While there is a normal fluctuation or movement of air due to the rotation of the picking and doffing drums as well as the conventional suction type conveying means which move the cotton bolls from the harvester housing, there are nevertheless areas within the housing in which there is no movement of air, or movement will be of such a small amount as to not be capable of moving the material accumulated in the path of the draft. Consequently it is possible for dirt, trash, or other materials to fall on the floor structure of the housing and to accumulate thereon. For example, next to the shaft of the doffing mechanism there normally is created a relatively dead spot as far as movement of air is concerned. Also, at the lower end of this shaft, there is the accumulation of oil and grease about the journal of the doffer shaft. Consequently there can create an accumulation of this material, which as time passes, will become dirty or at least trash-infected and due to a sudden vibration in the harvester, will become loosened and will pass into the conveying system where it is swept into the relatively clean cotton. Consequently there will result in the area about this accumulation of trash or inferior cotton an inferior harvested product which must either be removed or which will reduce the overall quality of the cotton.

It is therefore the main purpose of the present invention to incorporate in a conventional type harvester an impeller which will sweep over the upper surface of the floor and will maintain the floor relatively clear of accumulations of any type material.

In the preferred manner of the invention, it is proposed to provide an impeller blade or arm on the lower end of the doffer drive shaft and in the space between the upper surface of the floor structure and the lower surface of lower doffer plate. The impeller blade will extend radially from the shaft and upon rotation of the doffer drum, the impeller arm will sweep over the floor while at the same time creating a draft of air adjacent the floor surface, both of which will operate to maintain the floor relatively clean.

Other objects and advantages of the present invention will become apparent to those skilled in the art as the nature of the invention is better understood from the following description and as shown in the accompanying drawings.

Figure 1:
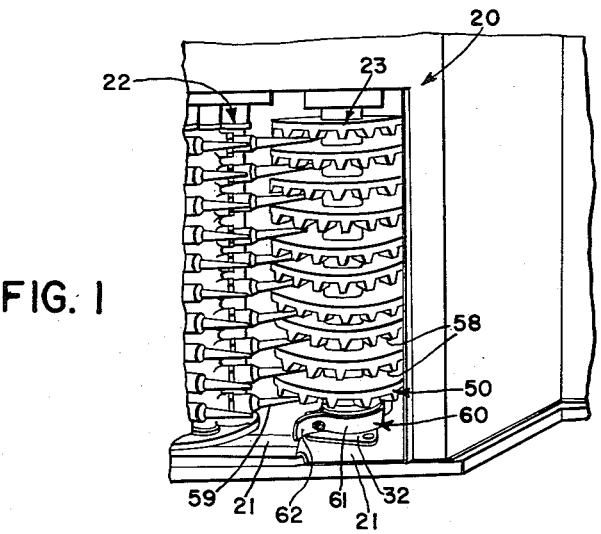
FIG. 1 is a side view of a cotton harvester mechanism with portions of the adjacent housing removed to clearly show portions of the mechanism.

Referring now to FIG. 1, there is provided an upright housing structure, indicated in its entirety by the reference numeral 20. The housing structure 20 includes a laterally disposed floor structure 21 composed of fore-and-aft extending floor plates and braces which underlie harvesting mechanism such as an upright picking drum 22 and an upright doffing drum 23. The floor structure 21 is generally open to permit trash and other materials to gravitate from the picker housing 20. The harvesting drum 22 and doffing drum 23 are generally shown and described only for purposes of orientation. Should a further detailed description of either be desired, such may be had by reference to the aforementioned Hubbard patent.

Figure 2:
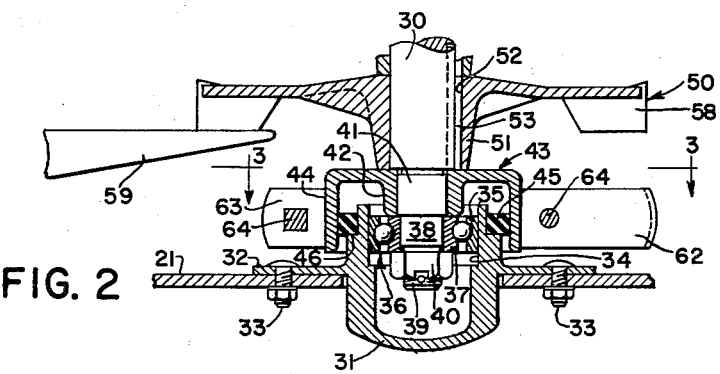
FIG. 2 is a vertical sectional view through the lower end of the doffing drum.

Referring specifically to FIG. 2, the doffing drum 23 includes an upright rotatably driven doffer shaft 30 the lower end of which is mounted in the floor structure 21 by means of an upwardly opening bearing cup 31 having radial flanges 32 bolted at 33 to the floor structure 11. The cup 31 has an annular internal axial face 34 which receives for axial movement relative thereto the outer race 35 of bearing or journal means 36. The bearing 36 has an inner race 37 which receives the lower recessed end 38 of the doffer shaft 30. The lower terminal end of the shaft 30 is threaded at 39 to receive a bolt 40 which locks the bearing 36 on the shaft 30. The shaft 30 is further provided with a radially recessed portion 41 which receives a hub 42 of a flange member 43. The flange member 43 has an axially extending annular wall or flange 44 which overlies the upper end of the cup member 31. An annular sealing gasket 45 is positioned between the inner surface of the annular wall 44 and the outer surface of the bearing cup 31. The bearing cup 31 has a shoulder 46 on which the seal may seat itself. As may be seen clearly from viewing FIG. 2, the annular wall 34 of the sealing cup 31 and the internal face of the flange 44 has axial length so that the bearings 36, shaft 30 and flange member 43 may be moved vertically.

Supported on the shaft 30 is a plurality of vertically spaced doffer plates 50, each plate 50 having an internal hub portion 51 adjacent the shaft 30 and provided with an internal axial keyway 52. The shaft 30 is provided with a complementary keyway which receives a key 53, which also seats in the keyway 52 and thereby locks the shaft 30 and doffer plates against relative rotation. The hub portion 51 is of such length that the hubs of the adjacent plates may be stacked on top of one another and will provide correct spacing between the plates 50 and provide a uniform and continuous column of doffer plates. The lower of the plates 50 rests against the upper surface of the flange member 43 and consequently is relatively close to but spaced above the floor structure 21. Provided on the outer periphery of the plates 50 are depending wiper pads 58 which contact the outer or picking end of harvester spindles 59 and in conventional manner wipe or dislodge the cotton from the spindles.

Figure 3:
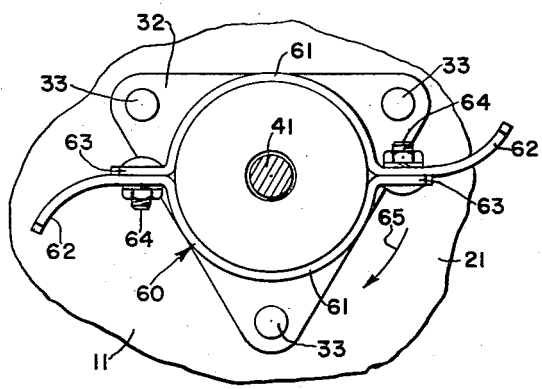
FIG. 3 is a sectional view taken substantially along the line 3—3 of FIG. 2.

A pair of sweep or impeller arms 60 are provided between the lower doffer plate 50 and the upper surface of the floor structure 21. Each arm 60 is provided with an inner semi-annular portion 61 which lies adjacent the outer surface of the annular wall or flange 44. The arm members 60 are further provided with radially outwardly extending sweep portions 62 and short radial flanges 63. As may be seen clearly from viewing FIG. 3, the semi-annular portions 61 fit on opposite sides of the flange or wall portion 44 and the radial flange 63 of one arm member 60 lies adjacent the arm portion 62 of the other arm member 60. The pair of arm members 60 are clamped on the annular flange 44 by means of tightening bolts 64 extending through the flange portion 63 and arm portions 62. Consequently the arm members 60 are fixed rigidly to the flange 44 and will rotate in unison therewith. The entire flange member 43 is tightened rigidly on the shaft 30 by means of the nut 40 and consequently will rotate in unison with the auger drive shaft 30. The radial arm portions 62 are shaped to extend from an inner end adjacent the shaft 30 in a radially outwardly and trailing direction relative to the direction of travel, as indicated by the arrow 65, to an outer free end.

The arm members 60 are composed of a metal strap which has a vertically disposed surface or face extending between upper and lower edges. Consequently as the arms 60 are rotated, not only will the arm portions 62 tend to sweep material from directly under the doffing mechanism but the arms 62 will also tend to create a draft of air passing over the upper surface of the floor structure 21 so that material which would normally collect thereon will be blown or moved.

While only one form of the invention has been shown, it should be recognized that other forms and variations will occur to those skilled in the art. Therefore, it should be understood that while the present disclosure was shown and described in detail for purposes of completely and fully explaining the principles of the invention, it was not the intention to so limit or narrow the invention beyond the broad concepts set forth in the appended claims.

What is claimed is:
1. In a cotton harvester having an upright housing structure including therein a horizontally disposed floor plate and an upright doffing drum with vertically spaced laterally extending doffing plates thereon supported in the housing structure to rotate about a vertical axis, the improvement comprising: a radial sweep arm disposed beneath the lower of the doffing plates and closely adjacent the floor plate; and means mounting the arm on the drum to effect rotation of the sweep arm in a lateral plane in response to rotation of the drum whereby material will be swept off the floor plate.

2. An attachment for a doffing drum for a cotton harvester in which the doffing drum is supported on a floor structure and includes a vertically disposed central rotatably driven shaft with its lower end journaled on the floor structure and a plurality of vertically spaced apart and laterally disposed doffing plates fixed to the shaft with the lower of said plates spaced from the floor structure, the improvement comprising: a laterally disposed impeller arm disposed between the lower doffer plate and the floor structure having a lower edge thereof closely adjacent the floor structure and an upper edge adjacent the lower doffing plate with an upright surface between the upper and lower edges; means fixing the impeller arm to and in a radial disposition relative to the doffer shaft whereby the impeller arm will sweep over part of the floor structure and effect a draft of air over the floor structure to clear material from the upper surface of the floor structure upon rotation of the shaft.

References Cited in the file of this patent
UNITED STATES PATENTS

| | | |
|---|---|---|
| 1,751,389 | Bledsoe | Mar. 18, 1930 |
| 1,801,996 | Benjamin | Apr. 21, 1931 |
| 1,828,534 | Johnston et al. | Oct. 20, 1931 |
| 1,888,506 | Johnston | Nov. 22, 1932 |
| 2,034,907 | Johnston | Mar. 24, 1936 |
| 2,657,514 | Rust | Nov. 3, 1953 |
| 2,791,082 | McDonough et al. | May 7, 1957 |